UNITED STATES PATENT OFFICE.

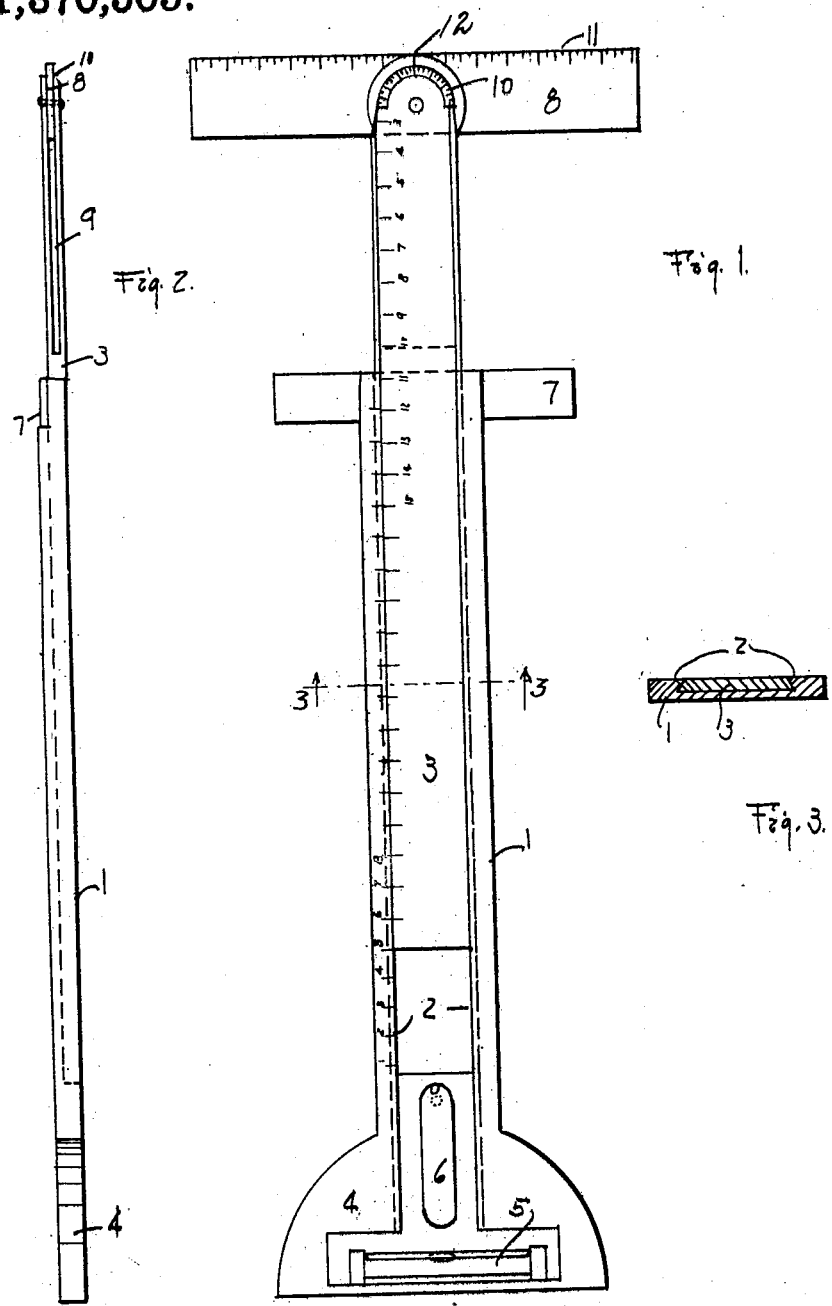

JOHN GROVER ANDREE, OF SEATTLE, WASHINGTON.

SCALE.

1,370,505.　　　Specification of Letters Patent.　　Patented Mar. 8, 1921.

Application filed June 3, 1918. Serial No. 237,959.

*To all whom it may concern:*

Be it known that I, JOHN GROVER ANDREE, citizen of the United States, residing at Seattle, in the county of King and State of Washington, have invented certain new and useful Improvements in Scales, of which the following is a specification.

This invention relates to improvements in scales and more particularly to machinists' precision scales and has for its principal object to provide an improved and novel combination scale which facilitates the laying out of centers and spacing of holes in a circle; to provide a combination level surface gage, dimension scale and bevel square in one tool.

Other objects will appear as my invention is more fully explained in the following specification, illustrated in the accompanying drawings and pointed out in the appended claims.

Figure 1 is a front elevation of my device. Fig. 2 is a side elevation of same. Fig. 3 is an enlarged cross sectional view on the line 3—3 of Fig. 1.

Referring more particularly to the drawings numeral 1 indicates a scale standard having a longitudinal and undercut groove 2 within which a scale slide 3 is slidably mounted. The adjacent edges of members 1 and 3 are graduated the former from the bottom toward the top and the latter from the top toward the bottom. At the lower end of standard 1 a base 4 is formed, the lower edge of which is at right angles to the face of the standard. Spirit levels 5 and 6 are mounted on base 4 for vertical and horizontal work respectively. The upper end of standard 1 is provided with a T head 7 which projects at right angles beyond either edge of the standard. The slide 3 extends beyond head 7 and carries a bevel scale 8 which is pivotally mounted within a slot 9 in slide 3 and which may be arranged at right angles to slide 3. The upper end of slide 3 is rounded and beveled as at 10 and is graduated in degrees. Bevel scale 8 is graduated along its upper edge as at 11 and at approximately the center point of such graduations is provided with an indicating line 12 adapted to coöperate with scale 10 on slide 3. It will be understood that the scale 8 can be rotated to any desired angle with respect to the slide 3.

In the operation of the device in a particular use thereof—for example in determining where bolt openings are to be formed in a flange of a pipe union to register with already-formed holes in the flange of the coöperating member,—the pipe with its flange already formed with openings is placed on the head 7, and the pivot point of bevel scale 8 is centered with respect to the periphery of such pipe flange. This is accomplished by moving the slide 3 upwardly one-half the known diameter of the flange, using the scale on standard 1 or on slide 3 as may be convenient, to secure the vertical position; and then by the scale 11, on the upper edge of said scale 8, the device is adjusted laterally until the line 12 is central between the edges of the pipe flange. As the pivot point of scale 8 has been previously adjusted to the center of the vertical diameter of the pipe flange, the latter adjustment just described moves said pivot point of scale 8 to the center of the horizontal diameter of the flange. The pivot point of the scale 8 is then at the center of the pipe flange, and said scale 8 is then turned on its pivot until the center of one of the formed holes in the pipe flange is brought into registry with the scaled edge of the bevel scale. The center of the hole is thus located, both by the angular reading on scale 10 and the linear reading on scale 11. The pipe flange in which holes are to be formed is then substituted for the first pipe flange and in the same position, and the hole to be formed worked, as by a center punch, at the particular point indicated by the readings obtained from the first pipe flange, as described. Of course all openings in the formed flange may be located as described at one operation, and the particular reading used to work corresponding holes in the other pipe flange at a single operation, that is without removing the flange. In using the device for indicating the angular line of cut for a V-coupling or elbow, the coupling is arranged with its main plane parallel with the standard 1 of the improved scale structure, the bevel-scale bar 8 turned to the desired angle—indicated by scale 10—and a line worked on the coupling. This line determines the particular line of cut.

It is thought that the numerous uses of the device will be apparent to one skilled in the art.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is:

1. A scale, comprising a standard, a slide movable in said standard and scaled to indicate the adjustment of said slide relative to such standard, a head fixed at right angles to said standard, a bevel scale bar pivotally mounted in the upper end of the slide and having linear scale marks on one edge thereof, the upper end of the slide having a quadrant scale and one of the linear scale works of the bevel scale bar coöperating with such quadrant scale in the pivotal movement of said scale bar.

2. A scale, comprising a standard, a base for supporting said standard, vertical and horizontal levels arranged in said base, a slide movable in said standard and scaled to indicate the adjustment of said slide relative to such standard, a head fixed at right angles to said standard, a bevel scale bar pivotally mounted in the upper end of the slide and having linear scale marks on one edge thereof, the upper end of the slide having a quadrant scale and one of the linear scale marks of the bevel scale bar coöperating with such quadrant scale in the pivotal movement of said scale bar.

In testimony whereof I affix my signature in the presence of two witnesses.

JOHN GROVER ANDREE.

Witnesses:
 MARGUERITE LEYDA,
 GENEVA ELDER.